United States Patent Office 3,036,797
Patented May 29, 1962

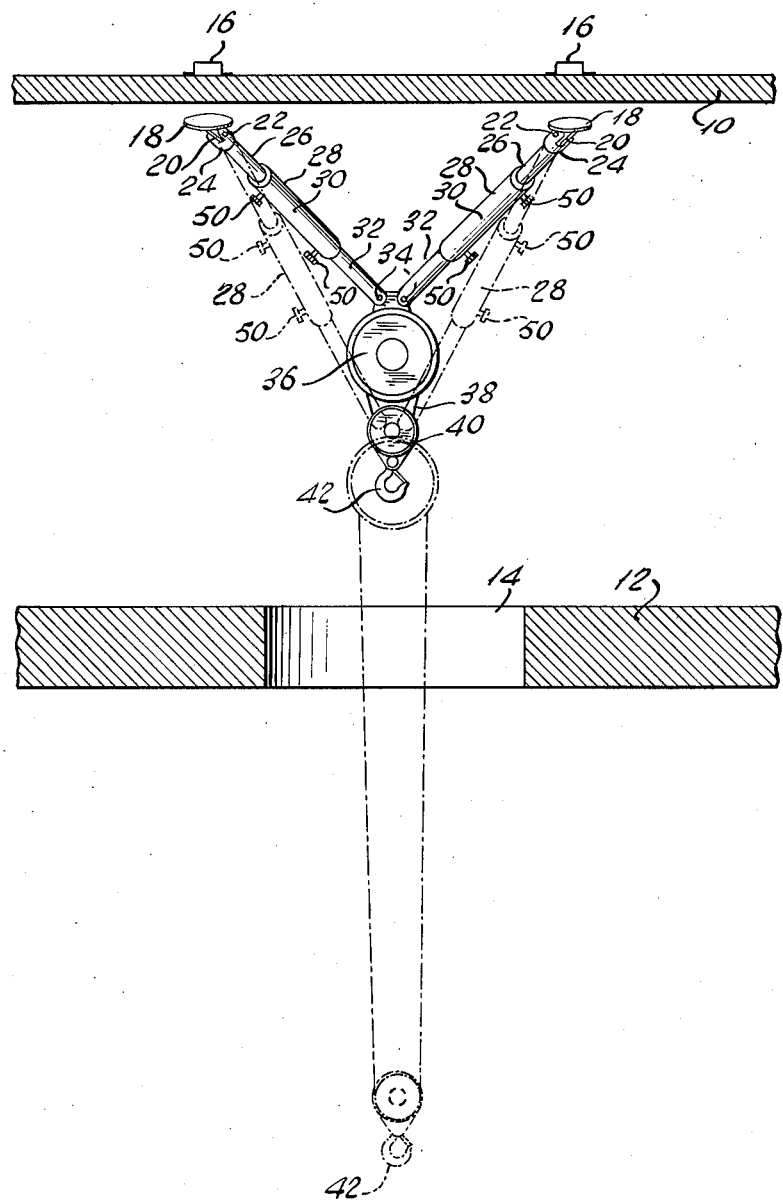

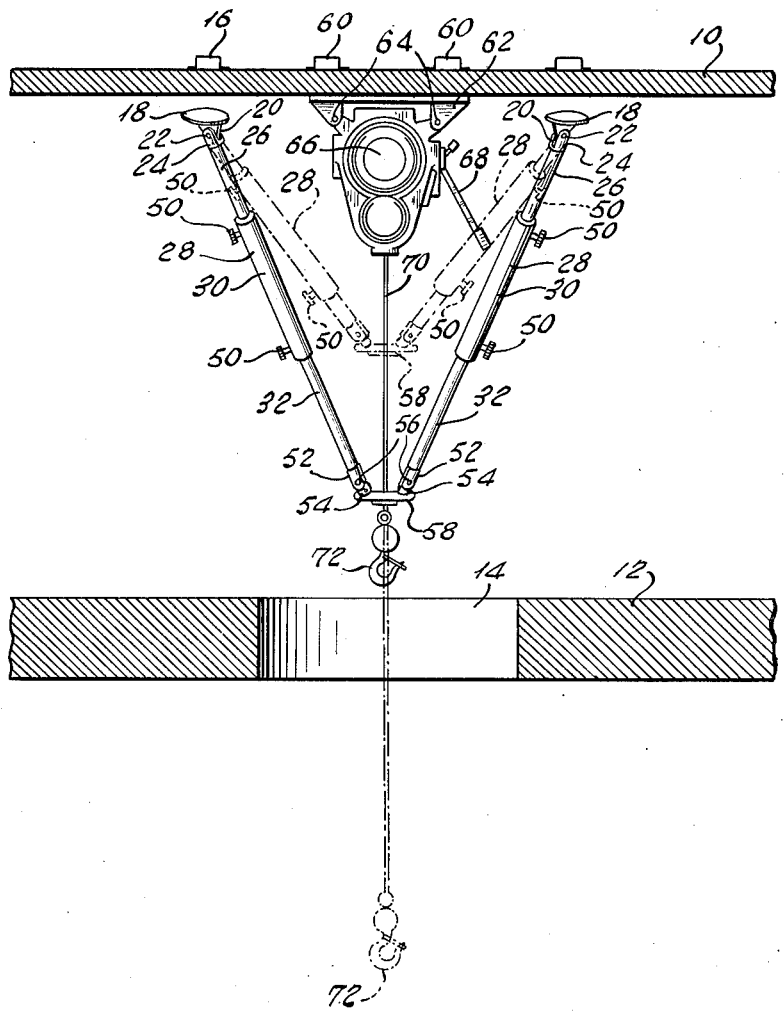

3,036,797
FREIGHT HANDLING MEANS FOR
HELICOPTERS
Domenico Agusta, Milan, Italy, assignor to Costruzioni
Aeronautiche Giovanni Agusta S.p.A., Cascina Costa,
Samarate, Italy
Filed Feb. 17, 1960, Ser. No. 9,333
Claims priority, application Italy Mar. 27, 1959
11 Claims. (Cl. 244—137)

This invention relates to cargoes and freight handling apparatus designed for use in conjunction with an aircraft structure, and in particular to a gin for use in conjunction with a winch in the freight compartment of a helicopter.

Helicoters are often used for the transportation of large and bulky cargoes from one location which is inaccessible for landing to another location which likewise may be undesirable for normally landing the helicopter.

Therefore, it is necessary for the helicopter to hover above the cargo and then suspend the cargo from the helicopter or to lift the cargo into the freight compartment of the helicopter. It is therefore highly desirable for a cargo handling apparatus to be mounted in the freight compartment of a helicopter, especially in such a manner that it may be readily detached and removed from the helicopter when not in use.

It is therefore an important object of the present invention to provide an overturned pyramid gin which can be detachably secured within the freight compartment of a helicopter.

A further object of the invention resides in the provision of a cargo handling apparatus having a support gin designed to maintain the cable means used in lifting and lowering the cargo along the vertical axis of the barycenter of the helicopter.

Additionally, one of the features of the invention resides in the provision of an overturned pyramid gin having a plurality of telescoping legs so arranged as to pivotally support a winch, wherein the winch may be adjusted along the vertical axis of the barycenter of the helicopter, with the winch being disposed in alignment with a ventral opening or trap door in the floor of the freight compartment of the helicopter.

A further object of the invention resides in the provision of a novel gin for adjusting a guide ring for the cable means of a winch, which ring may be held in a vertically adjusted position along the vertical axis of the barycenter of a helicopter.

Still another object of the invention resides in the provision of means for facilitating cargo handling in a helicopter and avoiding undesirable swinging action of the suspension cable.

Yet another object of the invention lies in the utilization of couplings secured to the ceiling of the freight compartment of a helicopter simplifying the detachable connection of a supporting gin within the helicopter.

Still further objects and features of this invention reside in the provision of a cargo handling apparatus for a helicopter that is strong and durable, easy to install and employ, which is substantially foolproof in operation, and which is highly efficient in use.

These, together with the various ancillary objects and features of the invention, which will become apparent as the following description proceeds, are attained by this cargo handling apparatus, preferred embodiments being shown in the accompanying drawings, wherein:

FIG. 1 is a sectional view of a portion of the freight compartment of a helicopter illustrating an embodiment of the invention with the winch suspended from an overturned pyramid gin; and FIG. 2 is a view similar to FIG. 1 showing another embodiment of the invention, wherein the winch is suspended from the ceiling and the gin carries a guide ring for the cable means of the winch.

With continuing reference to the accompanying drawings, wherein like reference numerals designate similar parts in the two views, and with initial attention directed to FIG. 1, there is illustrated a portion of the freight compartment of a helicopter. The freight compartment has a ceiling 10 as well as a floor 12. The floor 12 is provided with a trap door or opening 14, which may be closed by a door or other closure (not shown); the opening 14 is in alignment with the vertical axis of the barycenter of the freight compartment of the helicopter.

There are provided four couplings or brackets 16 which are fixed to the ceiling 10 of the freight compartment. Associated with the couplings 16 and detachably secured thereto in any convenient manner as by bolts or other fasteners are fittings 18. The fittings 18 have apertured detents 20. Pivotally connected as at 22 to the fittings 18 are the end pieces 24 of leg sections 26 of the sectional tubular telescopic legs 28, each of which includes sections 30 and 32.

Pinned as at 34 so as to provide a pivotal support to the leg sections 32 is a winch 36 and a suitable cable 38 carrying pulley 40. The cable 38 is entrained about the winch 36 and is raised or lowered thereby. The pulley carries the hook 42. The cable 38 is designed to pass through the opening 14 to a position with the hook 42 outwardly of the freight compartment.

Suitable means such as locking bolts or keys 50, 50 are provided for locking the legs 28 in a selected position so as to suitably support the winch 36 at an optimum elevation though along the vertical axis of the center of gravity of the freight compartment and helicopter.

Thus, through the use of this overturned pyramid gin, the hook 42 which is adapted to engage the cargo will be maintained suspended from the center of gravity of the helicopter along an extension of the vertical axis of the barycenter, thereby facilitating cargo handling.

Referring now to the embodiment of the invention as is shown in FIG. 2, there will be noted that herein the legs 28 are provided with fittings 18 detachably secured to the couplings 16. In this form of the invention the leg sections 32 are provided with end pieces 52 which are bifurcated and between the bifurcated ends thereof are received detents 54 which are bored as are the bifurcated ends 52 for reception of pins 56 and provide means for pivotally suspending a guide ring 58 from the legs. Couplings or brackets 60 are provided on the ceiling 10 for supporting a plate 62 to which there is pivotally connected as at 64 a winch 66 provided with its corresponding operating controls 68. The winch 66 has entrained thereabout a cable 70 which extends centrally through the guide ring 58 and has a hook 72 mounted at the end thereof.

The telescopic legs 28 may be located in a selected position either extended as is shown in solid lines or in a compacted position as is shown in phantom lines. It is noted, however, that the guide ring 58 is maintained in position along the vertical axis of the center of gravity of the freight compartment and helicopter, thus facilitating cargo handling.

The winch 66 as well as the gin may be readily removed from the freight compartment when not in use. Furthermore, the hook 72 is designed to be lowered through the opening 14 outwardly of the freight compartment during freight handling and/or cargo carrying operations.

Thus, it will be seen that there has been defined a novel construction of cargo handling apparatus for use in the freight compartment of a helicopter having a ceiling and having a floor provided with an opening. The cargo handling apparatus includes also an overturned pyramid gin, means detachably securing the gin to the ceiling with the gin including a plurality of legs telescopically adjustable in length. The apex of the pyramid generally is always located along the vertical axis of the barycenter of the freight compartment, the apex being located in alignment with the opening.

In one form of the invention a winch 36 is suspended from the gin, while in the other form of the invention a winch 66 is suspended from the ceiling 10 and a ring forming a guide for the cable of the winch is suspended from the gin.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In a freight compartment of a helicopter having a ceiling and having a floor provided with an opening therein, an overturned pyramid gin, means for securing said gin to said ceiling, said gin including a plurality of legs, said legs being telescopically adjustable in length with the apex of said pyramid gin being always located along the vertical axis of the barycenter of the freight compartment, said apex being in alignment with said opening.

2. In a freight compartment of a helicopter having a ceiling and having a floor provided with an opening therein, an overturned pyramid gin, means for securing said gin to said ceiling, said gin including a plurality of legs, said legs being telescopically adjustable in length with the apex of said pyramid gin being always located along the vertical axis of the barycenter of the freight compartment, said apex being in alignment with said opening, a winch suspended from said gin, said winch being pivoted to said legs so that as said legs are extended and retracted said winch is lowered and raised respectively, cable means entrained about said winch extending through said opening, and a hook connected to said cable means disposed outwardly of said freight compartment.

3. The construction of claim 1, wherein said means for securing said gin to said ceiling includes a plurality of fittings adapted to be fixed to said ceiling, and pin means pivoting said legs to said fittings.

4. In a freight compartment of a helicopter having a ceiling and having a floor provided with an opening therein, an overturned pyramid gin, means for securing said gin to said ceiling, said gin including a plurality of legs, said legs being telescopically adjustable in length with the apex of said pyramid gin being always located along the vertical axis of the barycenter of the freight compartment, said apex being in alignment with said opening, and a guide ring pivoted to said legs at said apex.

5. In a freight compartment of a helicopter having a ceiling and having a floor provided with an opening therein, an overturned pyramid gin, means for securing said gin to said ceiling, said gin including a plurality of legs, said legs being telescopically adjustable in length with the apex of said pyramid gin being always located along the vertical axis of the barycenter of the freight compartment, said apex being in alignment with said opening, a winch suspended from said ceiling between said legs, cable means entrained about said winch, and a guide ring pivoted to said legs at said apex, said cable means extending through said guide ring.

6. In a freight compartment of a helicopter having a ceiling and having a floor provided with an opening therein, an overturned pyramid gin, means for securing said gin to said ceiling, said gin including a plurality of legs, said legs being telescopically adjustable in length with the apex of said pyramid gin being always located along the vertical axis of the barycenter of the freight compartment, said apex being in alignment with said opening, a winch suspended from said ceiling between said legs, cable means entrained about said winch, and a guide ring pivoted to said legs at said apex, said cable means extending through said guide ring said means for securing said gin to said ceiling including a plurality of fittings adapted to be fixed to said ceiling, and pin means pivoting said legs to said fittings.

7. The construction of claim 5, including hook means secured to said cable means, said cable means extending through said opening, said hook means being disposed outside of said compartment.

8. A hoisting device particularly for suspending cargo at a barycentrical point in a helicopter comprising a pyramid gin including guide means, first and second pluralities of telescopic leg members each having lower leg member portions pivotally connected to said guide means, at their lower ends said legs being telescopically adjustable and including means for fixing said legs in relation to each other in said adjusted position, a winch operatively associated with said pyramid gin including cable and hook means operatively guided by said guide means.

9. A hoisting device according to claim 8, wherein said guide means includes a central ring, said winch being mountable above said ring, said hook and cable means extending through the center of said ring.

10. A hoisting device for use in association with a helicopter having a ceiling with a floor provided with an opening therein comprising an overturned pyramid gin for guiding cargo during lifting, means for securing said gin to said ceiling, said gin including a plurality of legs, said legs being telescopically adjustable in length with the apex of said pyramid gin being always located at the vertical axis of the barycenter of said freight compartment, said apex being in alignment with said opening, and lifting cable guide means connected to said legs adjacent said apex.

11. A hoisting device according to claim 10, wherein said guide means includes a winch pivotally connected to said leg members adjacent the lower ends thereof.

References Cited in the file of this patent
FOREIGN PATENTS

| 17,711 | Great Britain | May 25, 1911 |
| 755,965 | Great Britain | Aug. 29, 1956 |